US012812332B2

(12) United States Patent
Wu

(10) Patent No.: US 12,812,332 B2
(45) Date of Patent: Nov. 24, 2026

(54) POSITIONING SYSTEM AND METHOD

(71) Applicant: Wistron Corp., New Taipei City (TW)

(72) Inventor: Pei Lun Wu, New Taipei City (TW)

(73) Assignee: WISTRON CORP., New Taipei City (TW)

(*) Notice: Subject to any disclaimer, the term of this patent is extended or adjusted under 35 U.S.C. 154(b) by 273 days.

(21) Appl. No.: 18/653,131

(22) Filed: May 2, 2024

(65) Prior Publication Data

US 2025/0254492 A1 Aug. 7, 2025

(30) Foreign Application Priority Data

Feb. 5, 2024 (TW) ................................ 113104333

(51) Int. Cl.
*H04W 4/029* (2018.01)
*H04W 4/02* (2018.01)

(52) U.S. Cl.
CPC .......... *H04W 4/029* (2018.02); *H04W 4/023* (2013.01)

(58) Field of Classification Search
CPC .............................. H04W 4/029; H04W 4/023
See application file for complete search history.

(56) References Cited

U.S. PATENT DOCUMENTS 9,949,085 B2 * 4/2018 Freeman-Baer ...... H04W 4/023
2013/0267242 A1 * 10/2013 Curticapean .......... G01S 5/0242 455/456.1
2014/0162693 A1 * 6/2014 Wachter ................ H04W 4/021 455/456.3
2014/0342754 A1 * 11/2014 Liu ....................... G01S 5/0252 455/456.2
2015/0156640 A1 * 6/2015 Nguyen ................ H04W 16/18 455/422.1
2015/0358781 A1 * 12/2015 Chen ..................... H04W 4/023 455/456.1
2025/0171016 A1 * 5/2025 Garimella ......... B60W 60/0015

FOREIGN PATENT DOCUMENTS

JP 2021156816 A * 10/2021

OTHER PUBLICATIONS

Chinese language office action dated May 16, 2025, issued in application No. TW 113104333.

* cited by examiner

*Primary Examiner* — Dhaval V Patel
(74) *Attorney, Agent, or Firm* — McClure, Qualey & Rodack, LLP

(57) ABSTRACT

A positioning system is provided in the invention. The positioning system may include a base station, a tracking device, and a server. The tracking device may obtain a plurality of first positioning data in a period and transmit the first positioning data to the base station. The server may receive the first positioning data from the base station, and generate a plurality of groups of candidate data. Each group of candidate data includes a different number of reference point data. The server may select one of the groups of candidate data, and transmit the selected group of candidate data to the tracking device through the base station. The tracking device may obtain a plurality of second positioning data in the next period, and transmit updated positioning data to the server through the base station according to the second positioning data and the selected group of candidate data.

20 Claims, 7 Drawing Sheets

POSITIONING SYSTEM AND METHOD

CROSS REFERENCE TO RELATED APPLICATIONS

This application claims priority of TW patent application No. 113104333 filed on Feb. 5, 2024, the entirety of which is incorporated by reference herein.

BACKGROUND OF THE INVENTION

Field of the Invention

The invention generally relates to positioning technology, and more particularly, to positioning technology in which the amount of positioning data which needs to be transmitted will be reduced.

Description of the Related Art

The narrowband internet of things (NB-IoT) is a low-power wide-area network (LPWAN) wireless communication standard specified by 3rd generation partnership project (3GPP). The NB-IoT may increase the range of mobile communication service. The NB-IoT can be applied to positioning devices, smart meters, water meters, gas meters, smart parking devices, smart streetlights, and so on.

However, NB-IoT devices may have higher power-saving requirements, and NB-IoT service may charge according to the amount of transmission data. Therefore, when the amount of transmission data (e.g., global positioning system (GPS) data) is over the limit as per the service amount, the NB-IoT device may consume more power, and the cost of the NB-IoT service will be increased.

Therefore, when positioning data is transmitted, how to reduce the power consumption of the NB-IoT device and decrease the amount of positioning data which needs to be transmitted is a subject which is worthy of discussion.

BRIEF SUMMARY OF THE INVENTION

A positioning system and method are provided to overcome the problems mentioned above.

An embodiment of the invention provides a positioning system. The positioning system includes a base station, a tracking device, and a server. The tracking device may obtain a plurality of first positioning data in a period, and transmit the plurality of first positioning data to the base station. The server may receive the plurality of first positioning data from the base station, and generating a plurality of groups of candidate data. Each group of candidate data may include a different number of reference point data. The server may select one of the groups of candidate data, and transmit the selected group of candidate data to the tracking device through the base station. The tracking device may obtain a plurality of second positioning data in the next period, and transmit updated positioning data to the server through the base station according to the plurality of second positioning data and the selected group of candidate data.

An embodiment of the invention provides a positioning method. The positioning method may be applied to a positioning system. The positioning method may include the following steps. A tracking device of the positioning system may obtain a plurality of first positioning data in a period. The tracking device may transmit the plurality of first positioning data to a base station of the positioning system. A server of the positioning system may receive the plurality of first positioning data from the base station. The server may generate a plurality of groups of candidate data, wherein each group of candidate data comprises a different number of reference point data. The server may select one of the groups of candidate data. The server may transmit the selected group of candidate data to the tracking device through the base station. The tracking device may obtain a plurality of second positioning data in the next period. The tracking device may transmit updated positioning data to the server through the base station according to the plurality of second positioning data and the selected group of candidate data.

Other aspects and features of the invention will become apparent to those with ordinary skill in the art upon review of the following descriptions of specific embodiments of a positioning system and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
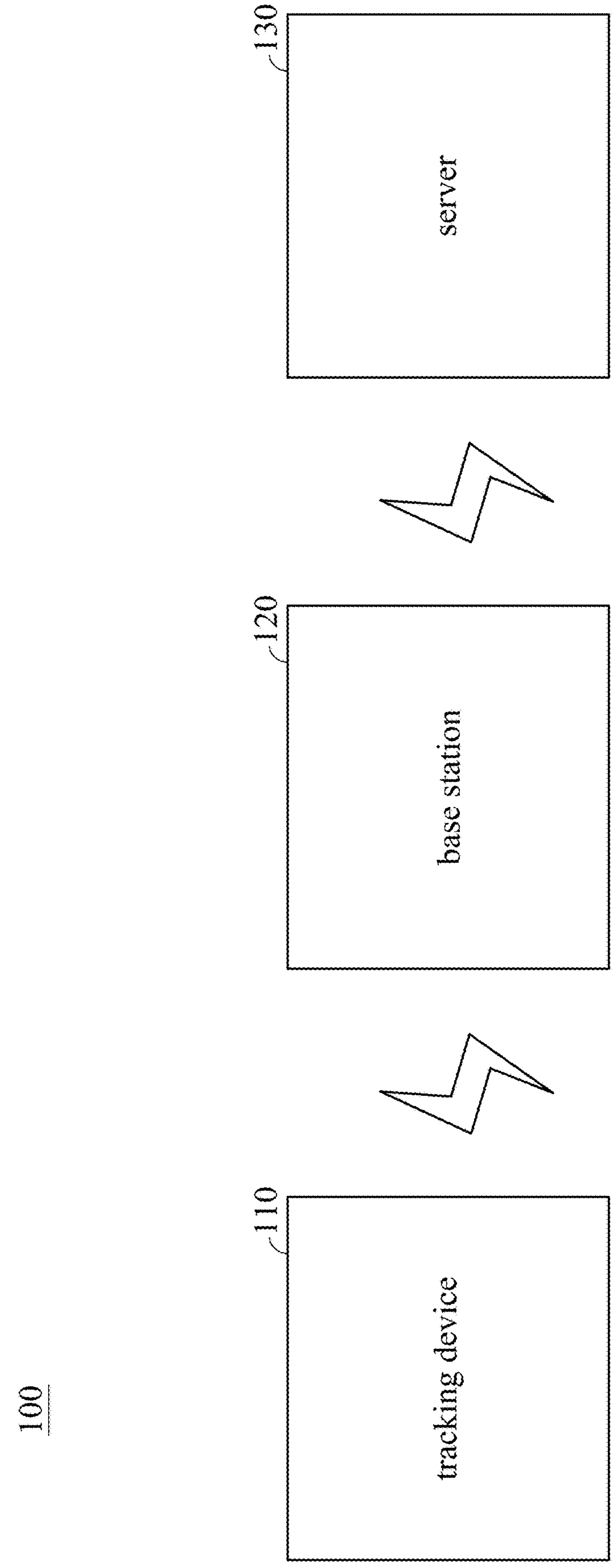
FIG. 1 is a block diagram of a positioning device 100 according to an embodiment of the invention.

FIG. 1 is a block diagram of a positioning device 100 according to an embodiment of the invention. As shown in FIG. 1, the positioning device 100 may comprise a tracking device 110, a station 120 and a server 130. The positioning device 100 may be applied to the data transmission of the narrowband internet of things (NB-IoT).

The tracking device 110 may be an electronic device with the NB-IoT transmission function. The tracking device 110 may be configured in a vehicle to performing the positioning for the vehicle which is used for logistics, agriculture and factory. The tracking device 110 may also be applied to the positioning of animal husbandry or drone, but the invention should not be limited thereto. The tracking device 110 may transmit the selected positioning data and information to the base station 120 through NB-IoT communication standards. The base station also can transmit the selected positioning data and information from the tracking device 110 to the server 130 through NB-IoT communication standards. The server 130 may be a remote server or a cloud server, but the invention should not be limited thereto.

Figure 2:
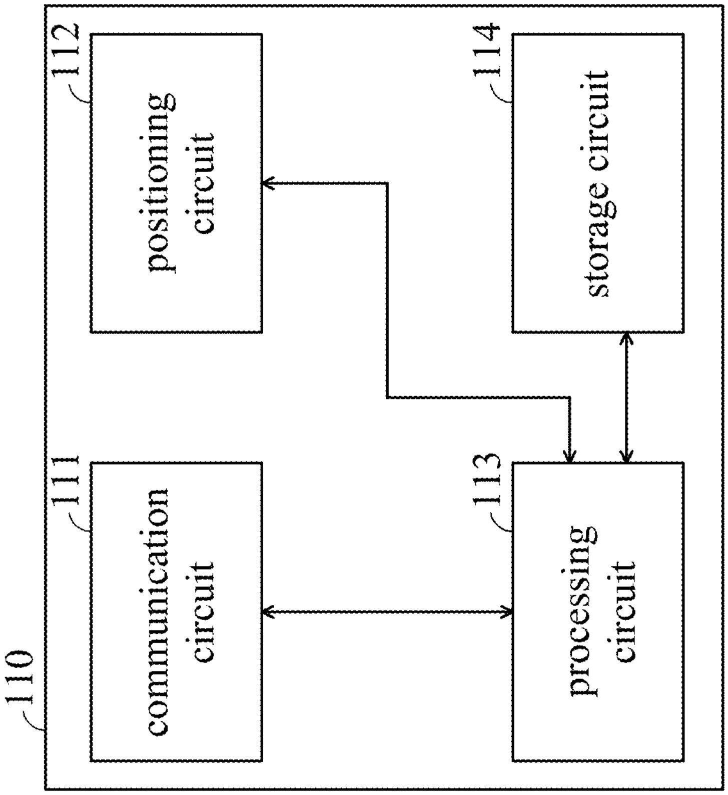
FIG. 2 is a block diagram of a tracking device 110 according to an embodiment of the invention.

FIG. 2 is a block diagram of a tracking device 110 according to an embodiment of the invention. As shown in FIG. 2, the tracking device 110 may comprise a communication circuit 111, a positioning circuit 112, a processing circuit 113, and a storage circuit 114. It should be noted that FIG. 2 presents a simplified block diagram in which only the elements relevant to the invention are shown. However, the invention should not be limited to what is shown in FIG. 2. The tracking device 110 may also comprise other elements.

According to the embodiments of the invention, the communication circuit 111 may at least comprise a subscriber identity module (SIM) card, a radio frequency (RF) signal processing device, a baseband signal processing device and at least one antenna, but the invention should not be limited thereto. The RF signal processing device may receive RF signals through antenna, and process the received RF signal to convert the received RF signals to the baseband signals, which are processed by the baseband processing device. In addition, RF signal processing device may also receive baseband signals from the baseband processing device and convert the received baseband signals to RF signals.

According to the embodiments of the invention, the positioning circuit 112 may be configured to obtaining the global positioning system (GPS) data or information of the tracking device 110. According to an embodiment of the invention, the positioning circuit 112 may obtain a plurality of positioning data in every period (e.g., measuring period or tracking period). For example, the positioning circuit 112 may obtain 5 positioning data of the tracking device 110 during a period, but the invention should not be limited thereto.

According to the embodiments of the invention, the processing circuit 113 may be a processor, a microcontroller (MCU), but the invention should not be limited thereto. The processing circuit 113 may be used to control the operations of the communication circuit 111, positioning circuit 112 and storage circuit 114. According to an embodiment of the invention, the processing circuit 113 may be configured to related program codes or software to perform the operations of the tracking device 110 in the positioning method of the invention.

According to the embodiments of the invention, the storage circuit 114 may store the software and firmware program codes, system data, user data, etc. of the tracking device 110. The storage circuit 114 may be a volatile memory (e.g. Random Access Memory (RAM)), or a non-volatile memory (e.g. flash memory, Read Only Memory (ROM)), a hard disk, or a combination of the above memory devices.

According to an embodiment of the invention, after the tracking device obtains a plurality of first positioning data in a period, the tracking device 110 may determine whether the storage circuit 114 has stored the reference point data from the server 130. If the storage circuit 114 does not store the reference point data from the server 130, the tracking device 110 may transmit the first positioning data to the base station 120. Then, the base station 120 may transmit the first positioning data to the server 130.

Figure 3:
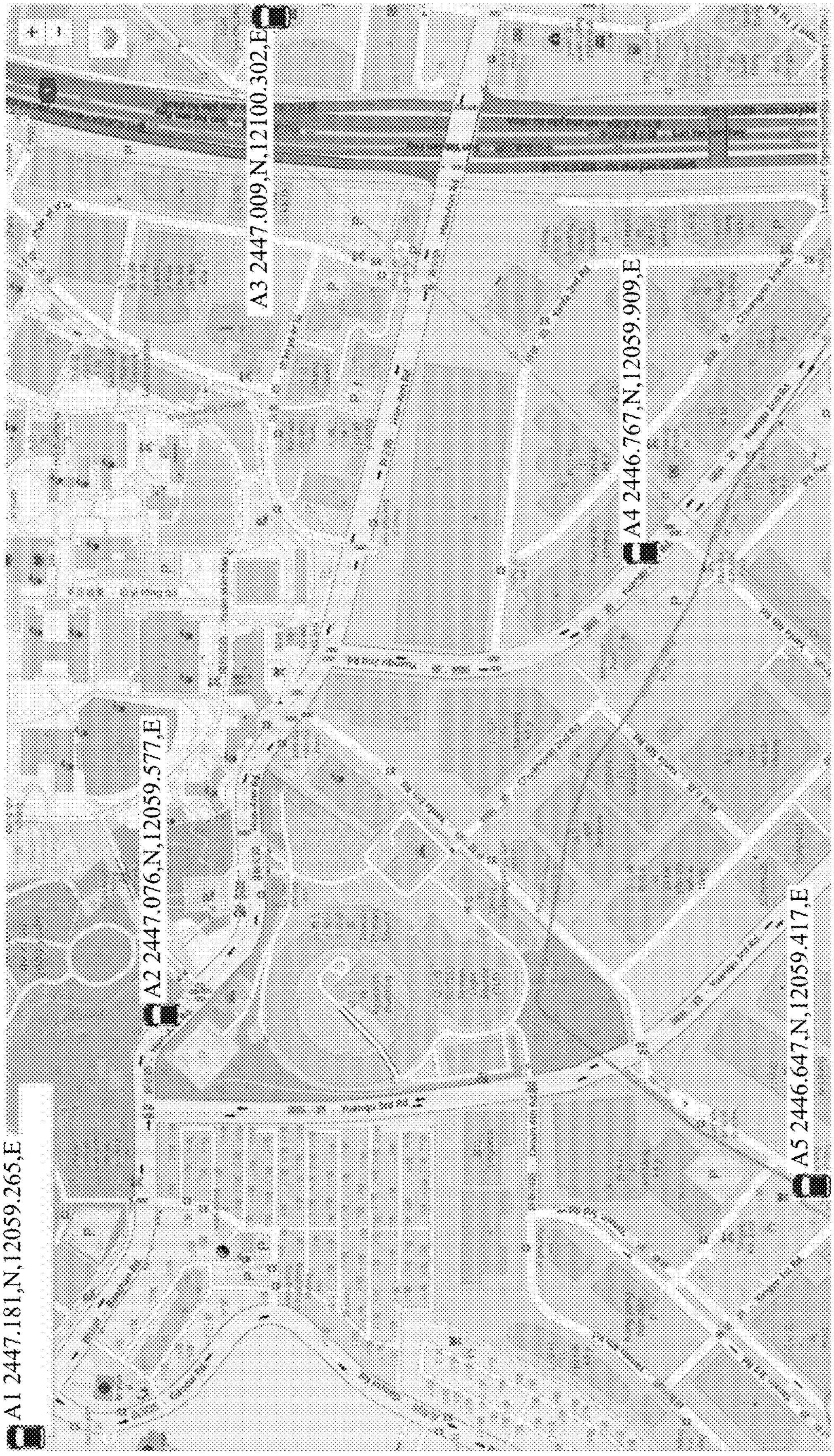
FIG. 3 is a schematic diagram of first positioning data according to an embodiment of the invention.

FIG. 3 is a schematic diagram of first positioning data according to an embodiment of the invention. As shown in FIG. 3, the first positioning data may comprise first positioning data A1-A5. The first positioning data A1 may correspond to the coordinate (2447.181,N,12059.265,E), the first positioning data A2 may correspond to the coordinate (2447.076,N,12059.577,E), first positioning data A3 may correspond to the coordinate (2447.009,N,12100.302,E), first positioning data A4 may correspond to the coordinate (2446.767,N,12059.909,E), first positioning data A5 may correspond to the coordinate (2446.647,N,12059.417,E).

Figure 4:
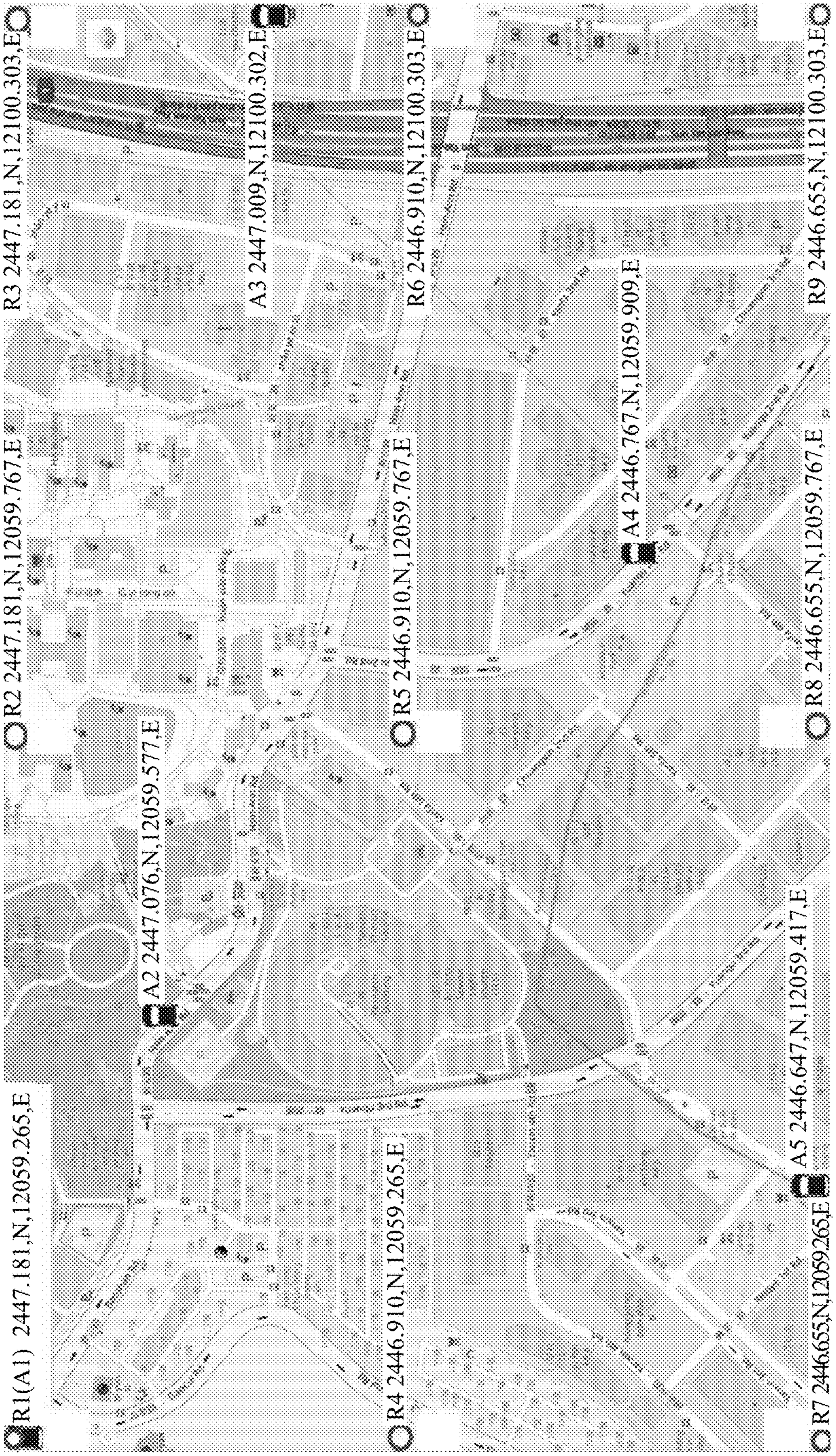
FIG. 4 is a schematic diagram of a group of candidate data according to an embodiment of the invention.
Figure 5:
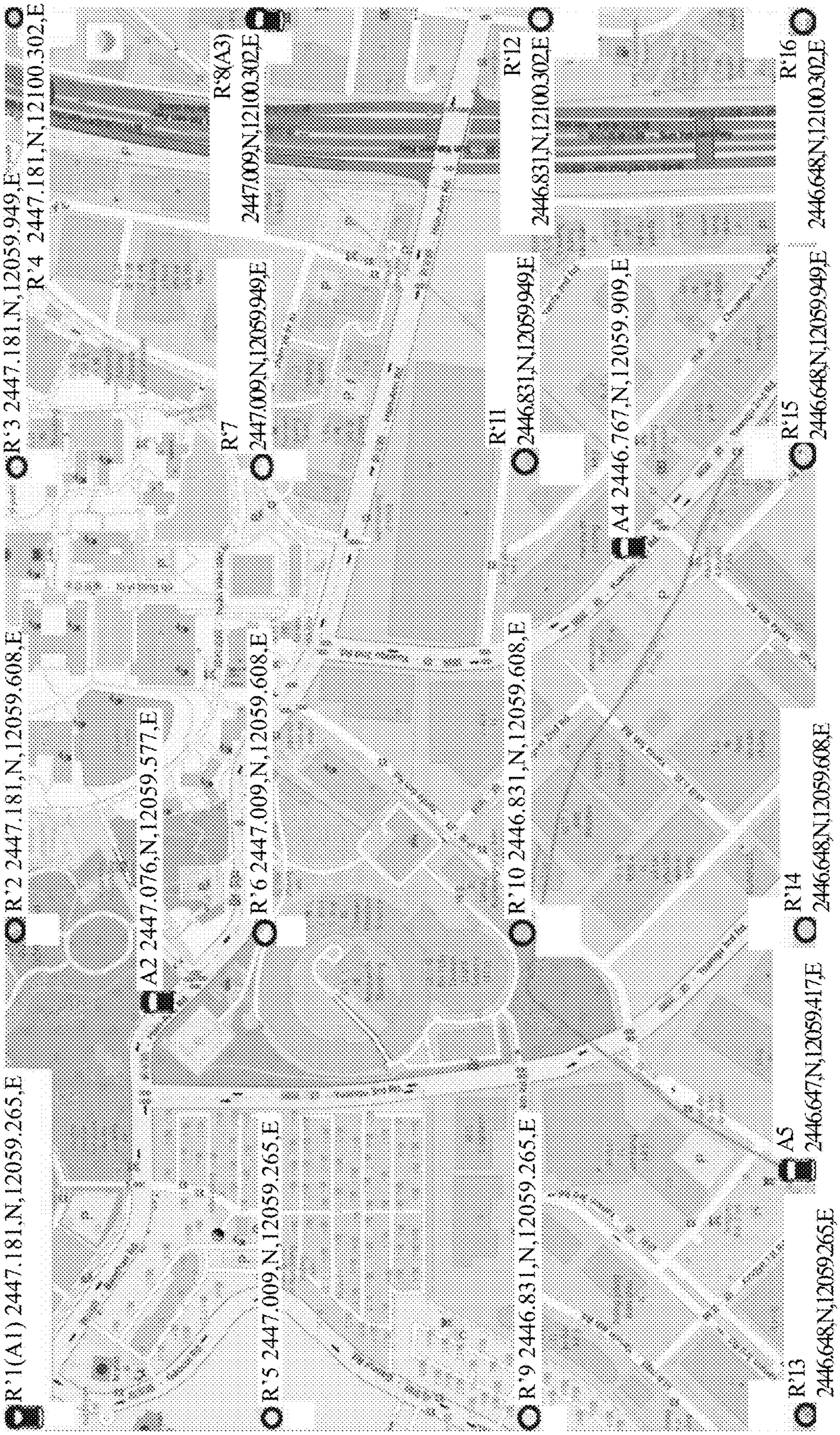
FIG. 5 is a schematic diagram of a group of candidate data according to another embodiment of the invention.

According to an embodiment of the invention, after the server 130 receives the first positioning data from the base station 120, the server 130 may parse or calculate the first positioning data. Firstly, the server 130 may generate a plurality of groups of candidate data according to the first positioning data. Each group of candidate data may comprise a different number of reference point data. Specifically, the server 130 may determine the positioning range according to the first positioning data, and then divide the positioning range according to different division ratios to generate the reference point data of each group of candidate data. FIG. 4 and FIG. 5 are taken as an example for illustration below. In addition, according to an embodiment of the invention, each reference point data may comprise coordinate information and a number.

FIG. 4 is a schematic diagram of a group of candidate data according to an embodiment of the invention. As shown in FIG. 4, the server 130 may determine a boundary of the position rang cording to the first positioning data A1-A5 to determine the position rang. Then, the server 130 may divide the position rang into 9 parts, and determine the reference point data R1-R9 in each part. The reference point data R1 (also is first positioning data A1) may correspond to coordinate (2447.181,N,12059.265,E) and number 1, the reference point data R2 may correspond to coordinate (2447.181,N,12059.767,E) and number 2, the reference point data R3 may correspond to coordinate (2447.181,N,12100.303,E) and number 3, the reference point data R4 may correspond to coordinate (2446.910,N,12059.265,E) and number 4, the reference point data R5 may correspond to coordinate (2446.910,N,12059.767,E) and number 5, the reference point data R6 may correspond to coordinate (2446.910,N,12100.303,E) and number 6, the reference point data R7 may correspond to coordinate (2446.655,N,12059.265,E) and number 7, the reference point data R8 may correspond to coordinate (2446.655,N,12059.767,E) and number 8, and the reference point data R9 may correspond to coordinate (2446.655,N,12100.303,E) and number 9. That is, in the embodiment, the group of candidate data may comprise reference point data R1-R9.

FIG. 5 is a schematic diagram of a group of candidate data according to another embodiment of the invention. As shown in FIG. 5, the server 130 may determine a boundary of the position rang cording to the first positioning data A1-A5 to determine the position rang. Then, the server 130 may divide the position rang into 16 parts, and determine the reference point data R'1-R'16 in each part. The reference point data R'1 (also is first positioning data A1) may correspond to coordinate (2447.181,N,12059.265,E) and number 1, the reference point data R'2 may correspond to coordinate (2447.181,N,12059.608,E) and number 2, the reference point data R'3 may correspond to coordinate (2447.181,N,12059.949,E) and number 3, the reference point data R'4 may correspond to coordinate (2447.181,N,12100.302,E) and number 4, the reference point data R'5 may correspond to coordinate (2447.009,N,12059.265,E) and number 5, the reference point data R'6 may correspond to coordinate (2447.009,N,12059.608,E) and number 6, the reference point data R'7 may correspond to coordinate (2447.009,N,12059.949,E) and number 7, the reference point data R'8 may correspond to coordinate (2447.009,N,12100.302,E) and number 8, the reference point data R'9 may correspond to coordinate (2446.831,N,12059.265,E) and number 9, the reference point data R'10 may correspond to coordinate (2446.831,N,12059.608,E) and number 10, the reference point data R'11 may correspond to coordinate (2446.831,N,12059.949,E) and number 11, the reference point data R'12 may correspond to coordinate (2446.831,N, 12100.302,E) and number 12, the reference point data R'13 may correspond to coordinate (2446.648,N,12059.265,E) and number 13, the reference point data R'14 may correspond to coordinate (2446.648,N,12059.608,E) and number 14, the reference point data R'15 may correspond to coordinate (2446.648,N,12059.949,E) and number 15, and the reference point data R'16 may correspond to coordinate (2446.648,N,12100.302,E) and number 16. That is, in the embodiment, the group of candidate data may comprise reference point data R'1-R'16.

After the server 130 generates or establish a plurality of groups of candidate data, the server 130 may select one of the groups of candidate data, and transmit the selected group of candidate data to the tracking device 110 through the base station 120. Specifically, the server 130 may compare the first positioning data to the reference point data of each group of candidate data to generate a comparison score for each group of candidate data. Then, the server 130 may select the group of candidate data with the highest comparison score from the groups of candidate data, and then transmit the selected group of candidate data to the tracking device 110 through the base station 120.

More specifically, according to an embodiment of the invention, the server 130 may compare the coordinate information of first positioning data with the coordinate information of the reference point data of each group of candidate data to select the reference point data having the highest similarity score with the first positioning data from each group of candidate data. Then, the server 130 may generate the comparison score of each group of candidate data according to the selected reference point data of each group of candidate data. According to an embodiment of the invention, for each group of candidate data, the server 130 may calculate the coordinate difference value (i.e., the number of the reduced numbers) between each first positioning data and its corresponding reference point data, sum up the coordinate difference values corresponding to the first positioning data, and take average of the summed value to generate the comparison score of each group of candidate data. After calculating the comparison score of each group of candidate data, the server 130 may select the group of candidate data with the highest comparison score, and transmit the group of candidate data with the highest comparison score to the tracking device 110 through the base station 120.

Taking FIG. 4 as an example, the server 130 may compare the coordinate information of first positioning data A1-A5 to the coordinate information of reference point data R1-R9 of the group of candidate data of FIG. 4 to select the reference point data having the highest similarity scores with the first positioning data A1-A5 from the group of candidate data (e.g., the reference point data having the closest distances (i.e., physical distance) with the first positioning data A1-A5, or the reference point data having the highest coordinate difference values (detail calculation can refer to the illustrations below) with the first positioning data A1-A5). As shown in FIG. 4, in an embodiment, if the reference point data having the closest distances (i.e., physical distance) is taken a basis for following determination, the reference point data R1 and the first positioning data A1 may have the highest similarity score, the reference point data R2 and the first positioning data A2 may have the highest similarity score, the reference point data R6 and the first positioning data A3 may have the highest similarity score, the reference point data R8 and the first positioning data A4 may have the highest similarity score, and the reference point data R7 and the first positioning data A5 may have the highest similarity score.

In another embodiment, if the reference point data having the highest coordinate difference values is taken a basis for following determination, the reference point data R5 and the reference point data R8 may both have the highest similarity score with the first positioning data A4. Therefore, in the embodiment, the server 130 can selectively select the reference point data R5 or the reference point data R8 for the following calculations.

Then, the server 130 may calculate the comparison score corresponding to the group of candidate data according to the selected reference point data. Specifically, the server 130 may calculate the coordinate difference value (i.e., the number of reduced numbers during transmission, details can refer to following description) of each first positioning data A1-A5 to its corresponding reference point data, and then sum up and take an average for the coordinate difference values of the first positioning data A1-A5. For example, the coordinate difference value between the first positioning data A1 and the reference point data R1 is 14 (i.e., 7 (the number of the same numbers of north latitude (N))+8 (the number of the same numbers of east longitude (E))−1 (the number of the words of the number (i.e., 1) corresponding to the reference point data R1)=14). The coordinate difference value between the first positioning data A2 and the reference point data R2 is 8 (i.e., 4 (the number of the same numbers of north latitude (N))+5 (the number of the same numbers of east longitude (E). It should be noted that when there is different number from left to right, the later numbers will not be concerned. Therefore, the same numbers between "12059.557" and "12059.767" may only be determined 5 numbers)−1 (the number of the words of the number (i.e., 2) corresponding to the reference point data R2)=8). The coordinate difference value between the first positioning data A3 and the reference point data R6 is 9 (i.e., 3 (the number of the same numbers of north latitude (N))+7 (the number of the same numbers of east longitude (E))−1 (the number of the words of the number (i.e., 6) corresponding to the reference point data R6)=9). The coordinate difference value between the first positioning data A4 and the reference point data R8 is 8 (i.e., 4 (the number of the same numbers of north latitude (N))+5 (the number of the same numbers of east longitude (E))−1 (the number of the words of the number (i.e., 8) corresponding to the reference point data R8)=8). The coordinate difference value between the first positioning data A5 and the reference point data R7 is 9 (i.e., 5 (the number of the same numbers of north latitude (N))+5 (the number of the same numbers of east longitude (E))−1 (the number of the words of the number (i.e., 7) corresponding to the reference point data R7)=9). Therefore, the comparison score of the group of candidate data is 9.6 (i.e., (14+8+9+8+9)/5−9.6).

Taking FIG. 5 as an example, the server 130 may compare the coordinate information of first positioning data A1-A5 to the coordinate information of reference point data R'1-R'16 of the group of candidate data of FIG. 5 to select the reference point data having the highest similarity scores with the first positioning data A1-A5 from the group of candidate data (e.g., the reference point data having the closest distances (i.e., physical distance) with the first positioning data A1-A5, or the reference point data having the highest coordinate difference values (detail calculation can refer to the illustrations below) with the first positioning data A1-A5). As shown in FIG. 5, in an embodiment, if the reference point data having the closest distances (i.e., physical distance) is taken a basis for following determination, the reference point data R'1 and the first positioning data A1 may have the highest similarity score, the reference point data R'6 and the first positioning data A2 may have the highest similarity score, the reference point data R'8 and the first positioning data A3 may have the highest similarity score, the reference point data R'11 and the first positioning data A4 may have the highest similarity score, and the reference point data R'13 and the first positioning data A5 may have the highest similarity score.

In another embodiment, if the reference point data having the highest coordinate difference values is taken a basis for following determination, the reference point data R'11 and the reference point data R'15 may both have the highest similarity score with the first positioning data A4. Therefore, in the embodiment, the server 130 can selectively select the reference point data R'11 or the reference point data R'15 for the following calculations.

Then, the server 130 may calculate the comparison score corresponding to the group of candidate data according to the selected reference point data. Specifically, the server 130 may calculate the coordinate difference value (i.e., the number of reduced numbers during transmission, details can refer to following description) of each first positioning data A1-A5 to its corresponding reference point data, and then sum up and take an average for the coordinate difference values of the first positioning data A1-A5. For example, the coordinate difference value between the first positioning data A1 and the reference point data R'1 is 14 (i.e., 7 (the number of the same numbers of north latitude (N))+8 (the number of the same numbers of east longitude (E))−1 (the number of the words of the number (i.e., 1) corresponding to the reference point data R'1)=14). The coordinate difference value between the first positioning data A2 and the reference point data R'6 is 9 (i.e., 5 (the number of the same numbers of north latitude (N))+5 (the number of the same numbers of east longitude (E))−1 (the number of the words of the number (i.e., 6) corresponding to the reference point data R'6)=9). The coordinate difference value between the first positioning data A3 and the reference point data R'8 is 14 (i.e., 7 (the number of the same numbers of north latitude (N))+8 (the number of the same numbers of east longitude (E))−1 (the number of the words of the number (i.e., 8) corresponding to the reference point data R'8)=14). The coordinate difference value between the first positioning data A4 and the reference point data R'11 is 8 (i.e., 4 (the number of the same numbers of north latitude (N))+6 (the number of the same numbers of east longitude (E). It should be noted that when there is different number from left to right, the later numbers will not be concerned. Therefore, the same numbers between “12059.909” and “12059.949” may only be determined 6 numbers)−2 (the number of the words of the number (i.e., 11) corresponding to the reference point data R'11)=8). The coordinate difference value between the first positioning data A5 and the reference point data R'13 is 9 (i.e., 6 (the number of the same numbers of north latitude (N))+5 (the number of the same numbers of east longitude (E))−2 (the number of the words of the number (i.e., 13) corresponding to the reference point data R'13)=9). Therefore, the comparison score of the group of candidate data is 10.8 (i.e., (14+9+14+8+9)/5=10.8).

Therefore, taking FIG. 4 and FIG. 5 as an example, if the server 130 generates two groups of candidate data as shown in FIG. 4 and FIG. 5, the server 130 may select the group of candidate data with the highest comparison score, and transmit the reference point data R'1-R'16 in the group of candidate data to the tracking device 110 through the base station 120.

According to an embodiment of the invention, after the tracking device 110 obtains the reference point data from the server 130, the tracking device 110 may store the reference point data in the storage circuit 114 to be taken as the reference of transmitting positioning data later. When the tracking device 110 obtains the second positioning data in the next period, the tracking device 110 may transmit updated positioning data to the server 130 through the base station 120 according to the second positioning data and the stored reference point data. Specifically, the tracking device 110 may compare the second positioning data to the stored reference point data to determine the updated positioning data which needs to be transmitted to the server 130.

According to an embodiment of the invention, when the tracking device 110 compares the second positioning data to the stored reference point data, the tracking device 110 may select the reference point data having the highest comparison result (e.g., refereeing to the above method of calculating the coordinate difference values between the first positioning data and the reference point data) with the second positioning data. In addition, the tracking device 110 may determine whether the highest comparison result corresponding to each second positioning data is greater than 0. If the highest comparison result of one second positioning data is greater than 0, when the tracking device 110 transmits the updated positioning data, the tracking device 110 may only need to transmit the difference information between the second positioning data and its corresponding reference point data (i.e., the tracking device 110 does not transmit the complete second positioning data). If the highest comparison result of one second positioning data is not greater than 0, when the tracking device 110 transmits the updated positioning data, the tracking device 110 may transmit the second positioning data. That is to say, if the highest comparison results of all second positioning data are not greater than 0, the tracking device 110 may transmit all second positioning data (i.e., the updated positioning data comprises all second positioning data) to the server 130.

Figure 6:
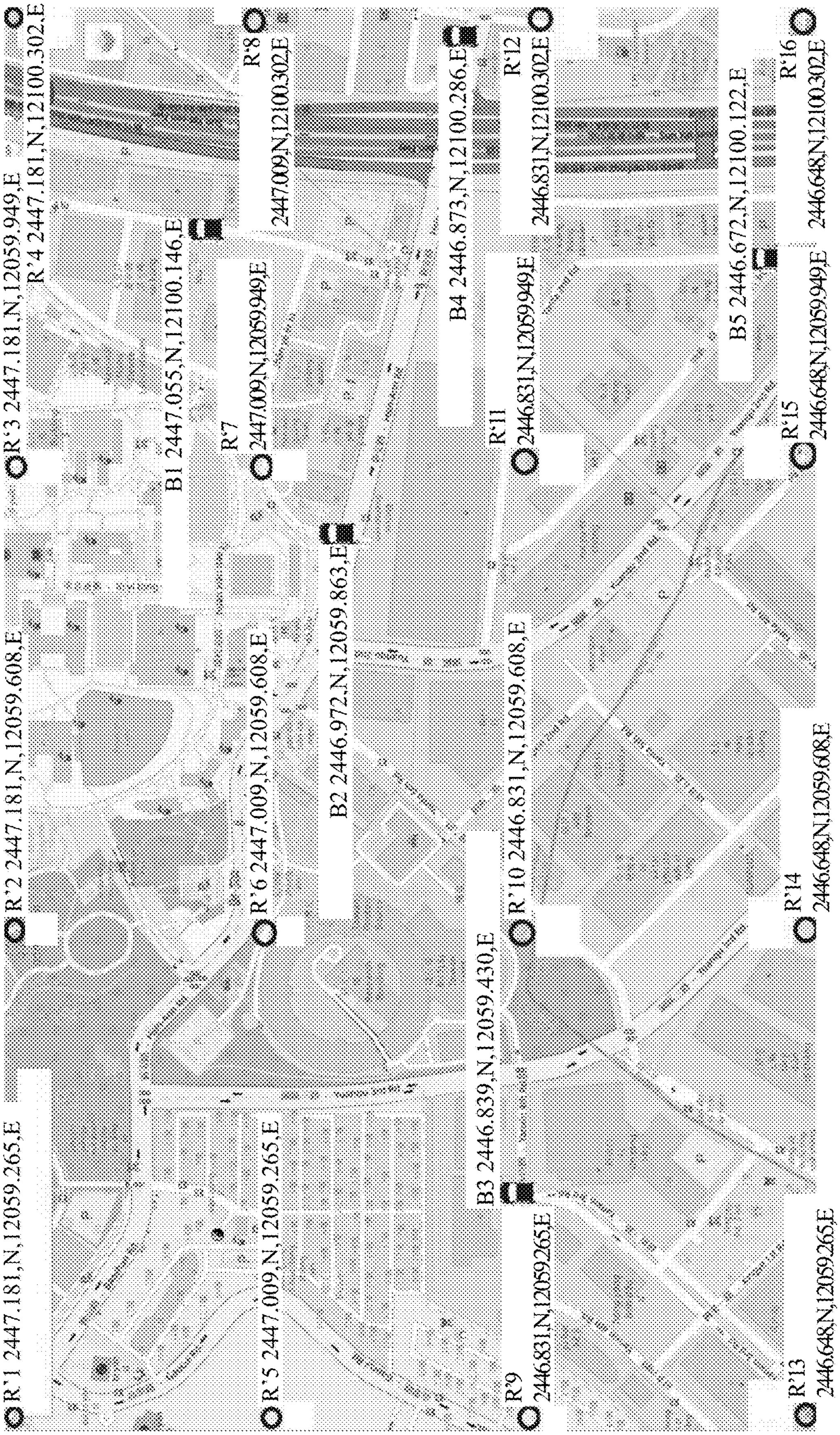
FIG. 6 is a schematic diagram of comparison of the second positioning data and the reference point data according to an embodiment of the invention.

FIG. 6 is a schematic diagram of comparison of the second positioning data and the reference point data according to an embodiment of the invention. As shown in FIG. 6, the second positioning data may comprise the second positioning data B1-B5. The second positioning data B1 may correspond to coordinate (2447.055,N,12100.146,E), the second positioning data B2 may correspond to coordinate (2446.972,N,12059.863,E), the second positioning data B3 may correspond to coordinate (2446.839,N,12059.430,E), the second positioning data B4 may correspond to coordinate (2446.873,N,12100.286,E), and the second positioning data B5 may correspond to coordinate (2446.672,N, 12100.122,E).

The tracking device 110 may compares the second positioning data B1-B5 to the stored reference point data R'1-R'16 to select the reference point data having the highest comparison results (e.g., refereeing to the above method of calculating the coordinate difference values between the first positioning data and the reference point data) with the second positioning data B1-B5. After the comparison, the reference point data R'8 has the highest comparison result with the second positioning data B1, the reference point data R'11 has the highest comparison result with the second positioning data B2, the reference point data R'9 has the highest comparison result with the second positioning data B3, the reference point data R'12 has the highest comparison result with the second positioning data B4, and the reference point data R'16 has the highest comparison result with the second positioning data B5. The highest comparison results corresponding to the second positioning data B1-B5 are greater than 0. Therefore, when the tracking device 110 transmit the updated positioning data to the server 130 through the base station 120, the tracking device 110 may only transmit the difference information between the second positioning data B1 and the reference point data R'8 (e.g., "8,55,146", wherein "8" in the front is the number of the reference point data R'8), the difference information between the second positioning data B2 and the reference point data R'11 (e.g., "11,972,863", wherein "11" in the front is the number of the reference point data R'11), the difference information between the second positioning data B3 and the reference point data R'9 (e.g., "9,9,430", wherein "9" in the front is the number of the reference point data R'9), the difference information between the second positioning data B4 and the reference point data R'12 (e.g., "12,73,286", wherein "12" in the front is the number of the reference point data R'12), and the difference information between the second positioning data B5 and the reference point data R'16 (e.g., "16,72,122", wherein "16" in the front is the number of the reference point data R'16).

Therefore, according to the embodiments of the invention, the tracking device 110 may not transmit all second positioning data to the server 130 through the base station 120. Therefore, the amount of positioning data which needs to be transmitted will be reduced.

After the server 130 receives the updated positioning data, the server 130 may also parse or calculate the updated positioning data to determine whether to transmit new reference point data to the tracking device 110.

According to an embodiment of the invention, if the positioning environment is a known fixed range, before the tracking device 110 leaves the factory, a plurality of reference point data corresponding to the positioning environment will stored in the tracking device 110 in advance to reduce the amount of positioning data which the tracking device 110 needs to be transmitted later.

Figure 7:
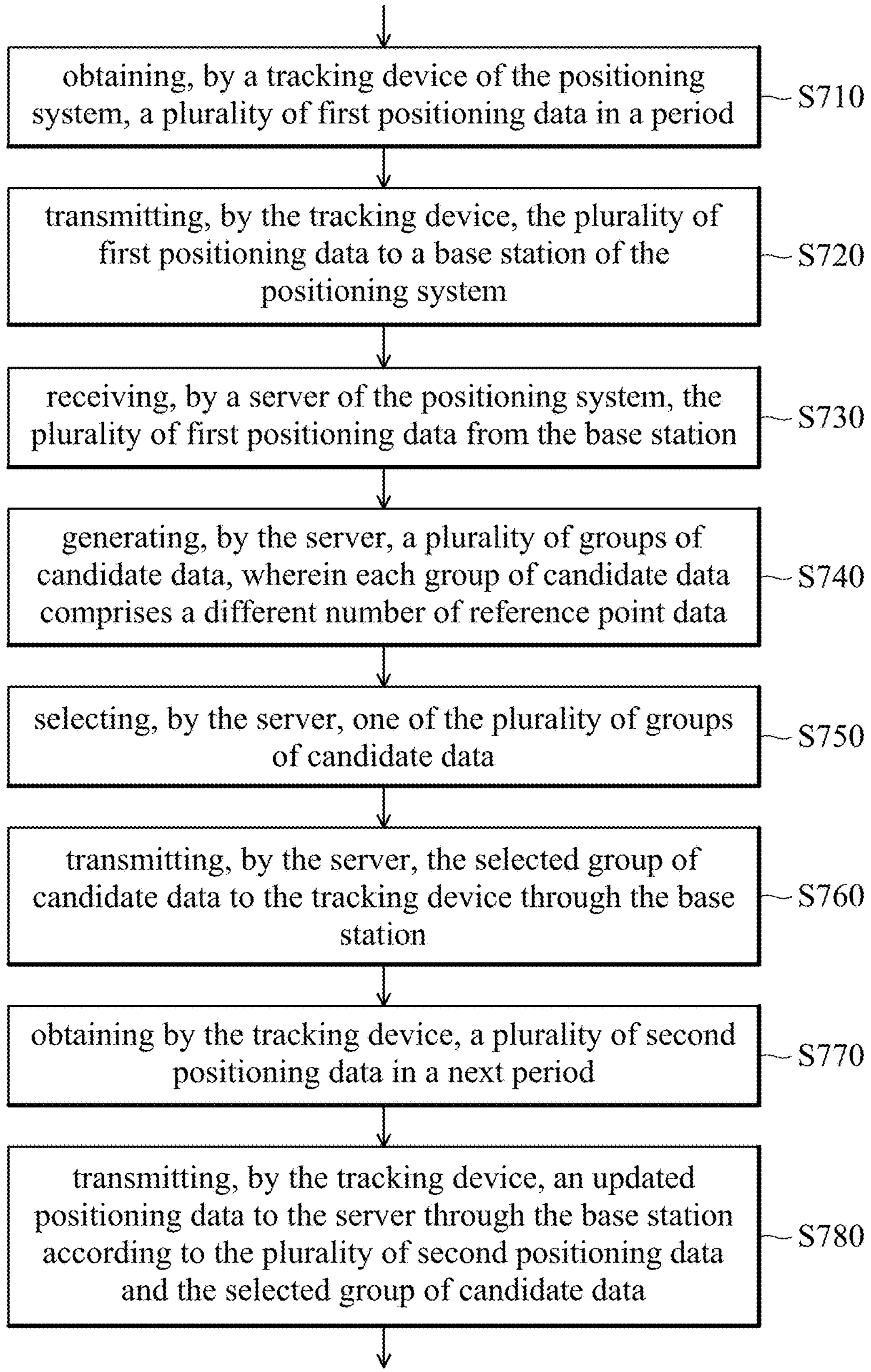
FIG. 7 is a flow chart illustrating a positioning method according to an embodiment of the invention.

FIG. 7 is a flow chart illustrating a positioning method according to an embodiment of the invention. The flow of FIG. 7 can be applied to the positioning system 100. As shown in FIG. 7, in step S710, the tracking device of the positioning system may obtain a plurality of first positioning data in a period.

In step S720, the tracking device of the positioning system may transmit the first positioning data to the base station of the positioning system.

In step S730, the server of the positioning system may receive the first positioning data from the base station of the positioning system.

In step S740, the server of the positioning system may generate a plurality of groups of candidate data according to the first positioning data, wherein each group of candidate data may comprise a different number of reference point data.

In step S750, the server of the positioning system may select one group of candidate data from the groups of candidate data.

In step S760, the server of the positioning system may transmit the selected group of candidate data to the tracking device through the base station.

In step S770, the tracking device of the positioning system may obtain a plurality of second positioning data in the next period In step S780, the tracking device of the positioning system may transmit updated positioning data to server through the base station according to the second positioning data and the selected group of candidate data.

According to an embodiment of the invention, in the positioning method, the server of the positioning system may determine the positioning range according to the first positioning data. Then, the server of the positioning system may divide the positioning range according to different division ratios to generate the reference point data of each group of candidate data.

According to an embodiment of the invention, in the positioning method, the server of the positioning system may compare each first positioning data to the reference point data of each group of candidate data to generate a comparison score for each group of candidate data. Then, the server of the positioning system may select the group of candidate data with the highest comparison score from the groups of candidate data, and transmit the reference point data in the selected group of candidate data to the tracking device through the base station.

According to an embodiment of the invention, in the positioning method, the server of the positioning system may compare the coordinate information corresponding to each first positioning data to the coordinate information corresponding to the reference point data of each group of candidate data to select the reference point data with the highest similarity score with the first positioning data from each group of candidate data.

According to an embodiment of the invention, in the positioning method, the server of the positioning system may generate a comparison score corresponding to each group of candidate data according to the reference point data selected from each group of candidate data to select the group of candidate data with the highest comparison score from the groups of candidate data.

According to an embodiment of the invention, in the positioning method, the tracking device of the positioning system may compare each second positioning data to the reference point data of the selected group of candidate data to determine the updated data transmitted to the server.

According to an embodiment of the invention, in the positioning method, when one of second positioning data has the highest comparison result with one of the reference point data, and the highest comparison result is greater than 0, the updated positioning data may comprise the difference information between this second positioning data and this reference point data, but not comprise this second positioning data.

According to an embodiment of the invention, in the positioning method, when one of second positioning data has the highest comparison result with one of the reference point data, and the highest comparison result is not greater than 0, the updated positioning data may comprise this second positioning data.

According to an embodiment of the invention, in the positioning method, each reference point data may comprise coordinate information and a number.

According to the positioning method provided in the invention, when the data is transmitted through NB-IoT communication, the stored reference positioning data can be used to reduce the amount of positioning data which the tracking device needs to transmit. Therefore, according to the positioning method provided in the invention, the power consumption of the tracking device will be reduced, and the transmission cost of the tracking device will also be decreased.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A positioning system, comprising:

a base station;

a tracking device, obtaining a plurality of first positioning data in a period, transmitting the plurality of first positioning data to the base station; and a server, receiving the plurality of first positioning data from the base station, and generating a plurality of groups of candidate data, wherein each group of candidate data comprises a different number of reference point data, wherein the server selects one of the plurality of groups of candidate data, and transmits the selected group of candidate data to the tracking device through the base station, and wherein the tracking device obtains a plurality of second positioning data in a next period, and transmits an updated positioning data to the server through the base station according to the plurality of second positioning data and the selected group of candidate data.

2. The positioning system of claim 1, wherein the server determines a positioning range according to the plurality of first positioning data, and the server divides the positioning range according to different division ratios to generate the reference point data of each group of candidate data.

3. The positioning system of claim 1, wherein the server compares each first positioning data to the reference point data of each group of candidate data to generate a comparison score for each group of candidate data, and wherein the server selects one group of candidate data with the highest comparison score from the plurality of groups of candidate data, and transmits the reference point data in the selected group of candidate data to the tracking device through the base station.

4. The positioning system of claim 3, wherein the server compares coordinate information corresponding to each first positioning data to coordinate information corresponding to the reference point data of each group of candidate data to select the reference point data with the highest similarity score with the first positioning data from each group of candidate data.

5. The positioning system of claim 4, wherein the server generates a comparison score corresponding to each group of candidate data according to the reference point data selected from each group of candidate data to select the group of candidate data with the highest comparison score from the plurality of groups of candidate data.

6. The positioning system of claim 1, wherein the tracking device compares each second positioning data to the reference point data of the selected group of candidate data to determine the updated data transmitted to the server.

7. The positioning system of claim 6, wherein when one of the plurality of second positioning data has the highest comparison result with one of the reference point data, and the highest comparison result is greater than 0, the updated positioning data comprises difference information between the one of the plurality of second positioning data and the reference point data, but does not comprise the one of the plurality of second positioning data.

8. The positioning system of claim 6, wherein when one of the plurality of second positioning data has the highest comparison result with one of the reference point data, and the highest comparison result is not greater than 0, the updated positioning data comprises the one of the plurality of second positioning data.

9. The positioning system of claim 1, wherein each reference point data comprises coordinate information and a number.

10. A positioning method, applied to a positioning system, comprising:

obtaining, by a tracking device of the positioning system, a plurality of first positioning data in a period;

transmitting, by the tracking device, the plurality of first positioning data to a base station of the positioning system;

receiving, by a server of the positioning system, the plurality of first positioning data from the base station;

generating, by the server, a plurality of groups of candidate data, wherein each group of candidate data comprises a different number of reference point data;

selecting, by the server, one of the plurality of groups of candidate data;

transmitting, by the server, the selected group of candidate data to the tracking device through the base station;

obtaining by the tracking device, a plurality of second positioning data in a next period; and transmitting, by the tracking device, an updated positioning data to the server through the base station according to the plurality of second positioning data and the selected group of candidate data.

11. The positioning method of claim 10, further comprising:

determining, by the server, a positioning range according to the plurality of first positioning data; and dividing, by the server, the positioning range according to different division ratios to generate the reference point data of each group of candidate data.

12. The positioning method of claim 10, further comprising:

comparing, by the server, each first positioning data to the reference point data of each group of candidate data to generate a comparison score for each group of candidate data;

selecting, by the server, one group of candidate data with the highest comparison score from the plurality of groups of candidate data; and transmitting, by the server, the reference point data in the selected group of candidate data to the tracking device through the base station.

13. The positioning method of claim 12, further comprising:

comparing, by the server, coordinate information corresponding to each first positioning data to coordinate information corresponding to the reference point data of each group of candidate data to select the reference point data with the highest similarity score with the first positioning data from each group of candidate data.

14. The positioning method of claim 13, further comprising:

generating, by the server, a comparison score corresponding to each group of candidate data according to the reference point data selected from each group of candidate data to select the group of candidate data with the highest comparison score from the plurality of groups of candidate data.

15. The positioning method of claim 10, further comprising:

comparing, by the tracking device, each second positioning data to the reference point data of the selected group of candidate data to determine the updated data transmitted to the server.

16. The positioning method of claim 15, wherein when one of the plurality of second positioning data has the highest comparison result with one of the reference point data, and the highest comparison result is greater than 0, the updated positioning data comprises difference information between the one of the plurality of second positioning data and the reference point data, but does not comprise the one of the plurality of second positioning data.

17. The positioning method of claim 15, wherein when one of the plurality of second positioning data has the highest comparison result with one of the reference point data, and the highest comparison result is not greater than 0, the updated positioning data comprises the one of the plurality of second positioning data.

18. The positioning method of claim 10, wherein each reference point data comprises coordinate information and a number.

19. A positioning device, comprising:

a positioning circuit, obtaining a plurality of first positioning data in a period, and obtaining a plurality of second positioning data in a next period;

a communication circuit, transmitting the plurality of first positioning data to a server through a base station;

a storage circuit, storing a group of candidate data selected according to the plurality of first positioning data, wherein each group of candidate data comprises a different number of reference point data; and a processing circuit, coupled to the positioning circuit, the communication circuit and the storage device, and transmitting an updated positioning data to the server through the base station according to the plurality of second positioning data and the selected group of candidate data.

20. The positioning device of claim 19, wherein the processing circuit compares each second positioning data to the reference point data of the selected group of candidate data to determine the updated data transmitted to the server.

* * * * *